Figure 6:
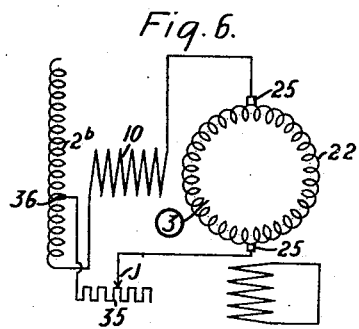

F. W. MEYER.
DYNAMO ELECTRIC MACHINE.
APPLICATION FILED MAR. 24, 1915.
1,284,412.
Patented Nov. 12, 1918.
4 SHEETS—SHEET 1.
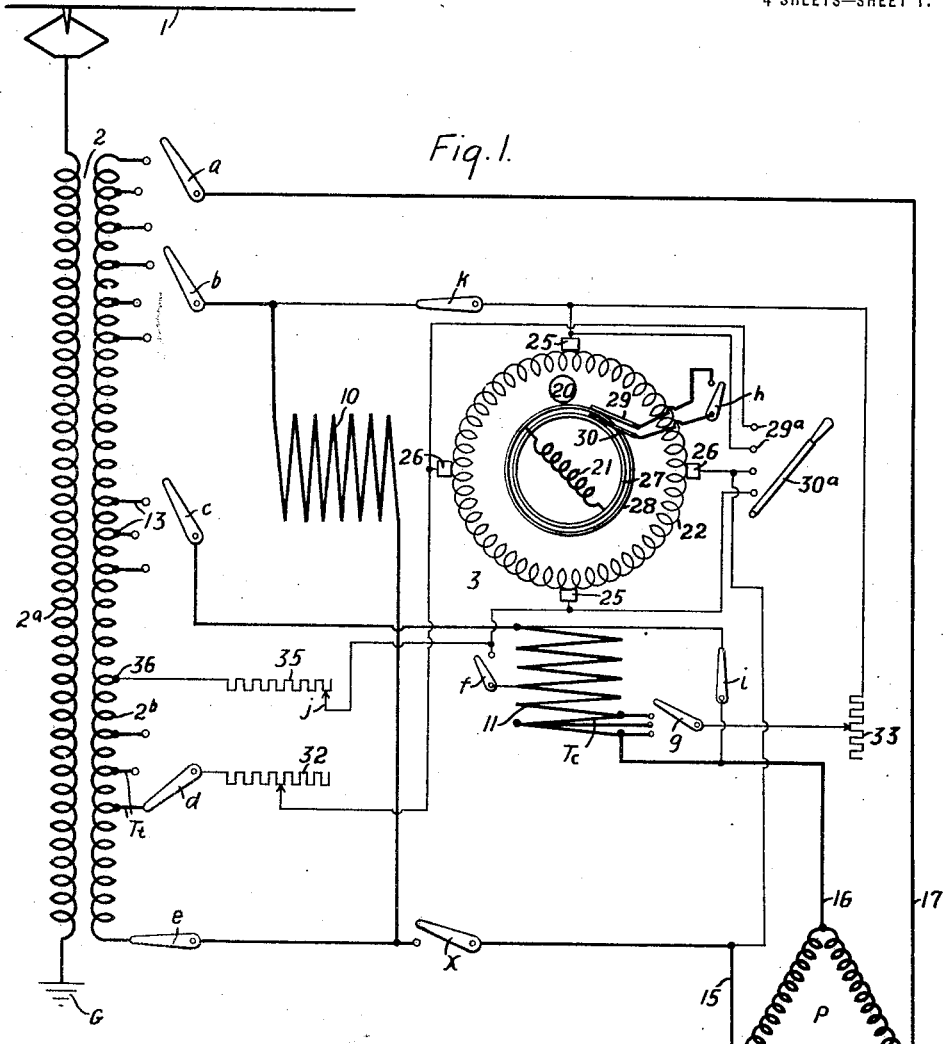
Fig. 1.
Fig. 2.
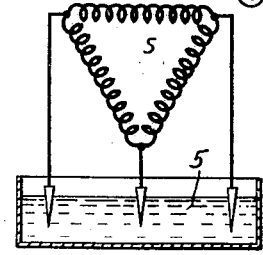
| | a | b | c | d | e | f | g | h | i | j | k | x |
|---|---|---|---|---|---|---|---|---|---|---|---|---|
| Starting | | | | | o | | | | o | o | o | |
| Running | o | o | o | | o | | | o | | | | o |
| Compensating | o | o | o | o | o | o | o | o | | | | o |
WITNESSES:
Fred. A. Lind.
L. C. Davis.
INVENTOR
Friedrich W. Meyer
BY
Wesley G. Carr
ATTORNEY

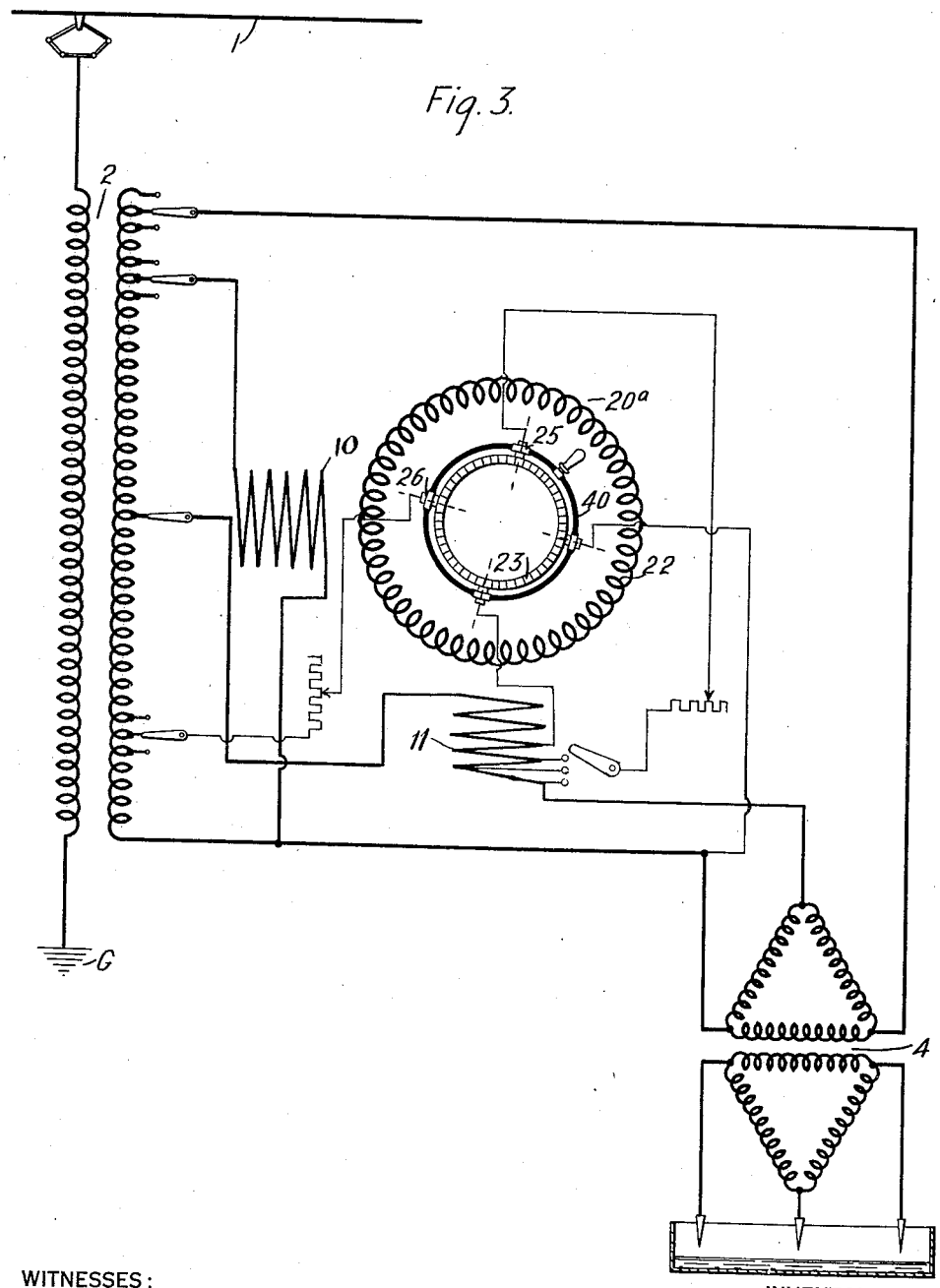

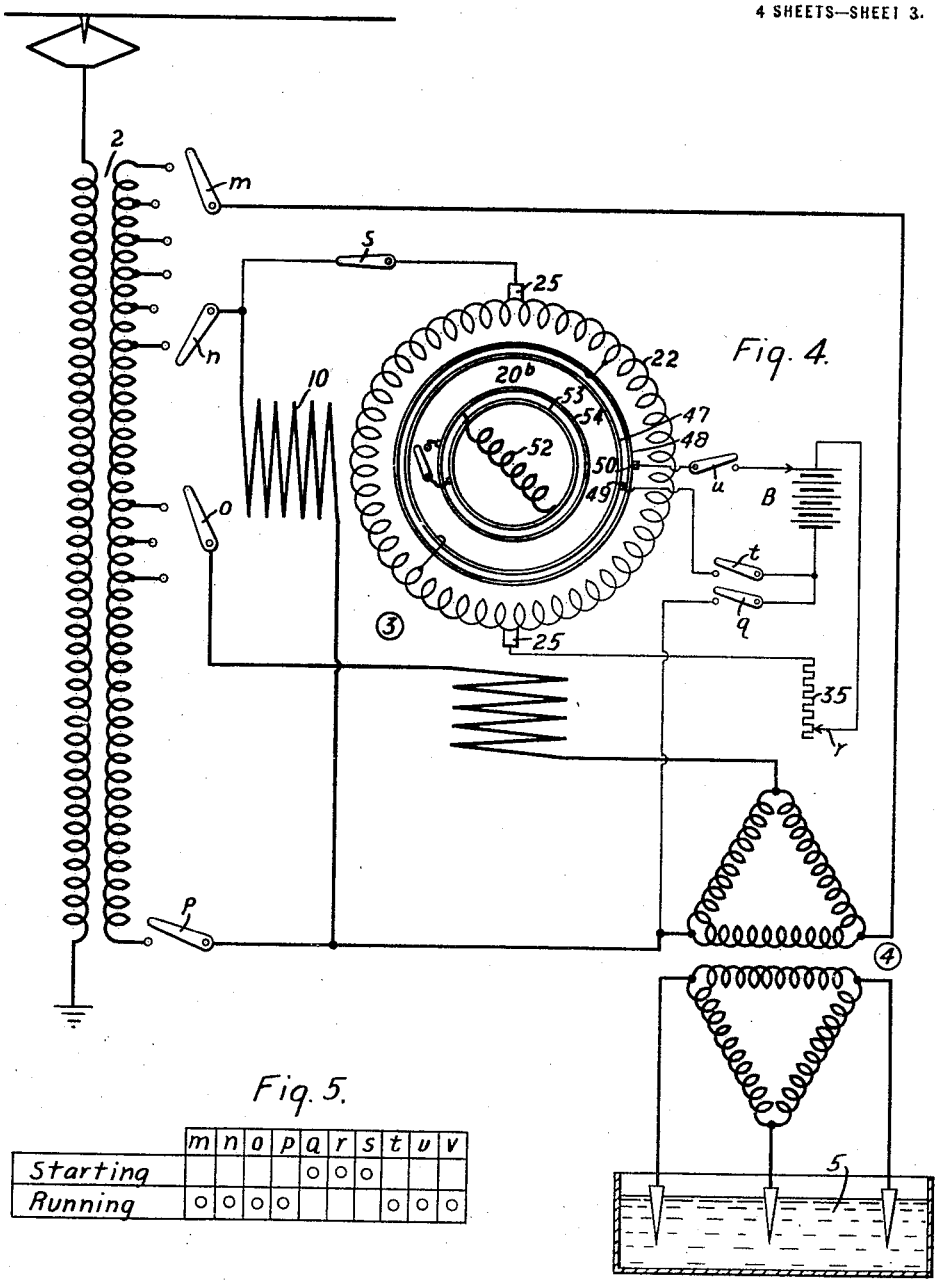

F. W. MEYER.
DYNAMO ELECTRIC MACHINE.
APPLICATION FILED MAR. 24, 1915.

1,284,412.

Patented Nov. 12, 1918.
4 SHEETS—SHEET 4.

WITNESSES:
Fred. A. Lind.
L. C. Davis.

INVENTOR
Friedrich W. Meyer
BY
Wesley G. Carr
ATTORNEY

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,284,412.     Specification of Letters Patent.     Patented Nov. 12, 1918.

Application filed March 24, 1915. Serial No. 16,686.

*To all whom it may concern:*

Be it known that I, FRIEDRICH W. MEYER, a subject of the Emperor of Germany and a resident of Pittsburgh, in the county of Allegheny and State of Pennsylvania, have invented a new and useful Improvement in Dynamo-Electric Machines, of which the following is a specification.

My invention relates to dynamo-electric machines, and it has special reference to alternating-current phase converters that are commonly employed for converting single-phase energy into polyphase energy for the purpose of supplying polyphase driving motors.

One of the objects of my invention is to provide apparatus and means of the above-indicated class, whereby the phase converter may be conveniently started into operation and brought up to synchronous speed and subsequently regulated in a simple and effective manner to compensate for the phase distortion therein under load conditions.

Another object of my invention is to provide a dynamo-electric machine, such as referred to, and to, in effect, combine a starting motor therewith in such manner that said motor shall constitute an inseparable part of the converter, and, moreover, to make provisions for utilizing a portion of the starting apparatus associated with the converter for effecting phase compensations therein during normal operation.

More specifically, it is an object of my invention to provide the rotor of a phase converter with a magnetizing winding which is connected to a commutator cylinder and which may be utilized, together with one of the stator windings, for bringing the converter up to speed in a manner corresponding to that of an ordinary series single-phase commutator motor.

In order to compensate for the phase distortions in the apparatus, under load conditions, I provide simple and effective means for utilizing the magnetizing winding and commutator cylinder, together with a portion of the stator windings of the converter itself, for introducing out-of-phase voltage components to the normal magnetizing or wattless energy, whereby any phase position of the converter voltages may be maintained and the inherent displacements of phase position may be compensated.

Moreover, the rotor is provided also with a normally open circuited damping winding which is ineffective during the starting operation but is afterward short-circuited and serves to carry the induced power currents.

It is old in the art to provide an auxiliary starting motor attached to the converter shaft for bringing the converter up to synchronous speed and, it has also been known to provide separate auxiliary apparatus for compensating for the phase distortion of the phase converter and thus improving the operating conditions.

According to my present invention, I propose to not only accomplish the desirable results heretofore secured through the means just referred to, but to combine the necessary apparatus in a simple manner so as to permit the attainment of the ends in view at relatively small expense and, moreover, to associate the auxiliary apparatus with the converter, whereby it actually constitutes a part of the phase converter itself. My invention also effectively provides for a uniform and stabilized operation of the phase converter under running conditions by reason of the employment of the commutator type of compensating apparatus and, thus renders it possible for the converter to readily accommodate itself to conditions and to smoothly resume its normal synchronous speed in case the voltage of the supply system fails for a momentary period, thereby allowing the speed of the converter to fall off.

My invention may best be understood by reference to the accompanying drawings, in which Figure 1 is a diagrammatic view of a dynamo-electric machine and system of control embodying my invention; Fig. 2 is a sequence chart showing the positions of the various control switches during different periods of operation of my system; Fig. 3 is a diagrammatic view of a modified form of my invention; Fig. 4 is a similar view of a further modification thereof, Fig. 5 is a sequence chart of the positions of the switches utilized in the system shown in Fig. 4, under different operating conditions and Figs. 6 to 10, inclusive, are simplified diagrammatic views illustrating the development of the connections in the systems of Figs. 1 and 4.

Referring to Figs. 1, 2, 6, 7 and 8, the system shown comprises a supply-circuit conductor 1, a transformer 2, a phase converter 3, a polyphase electric motor 4 and an adjustable resistor 5.

The supply-circuit conductor 1, such as a trolley conductor of a railway system, supplies single-phase alternating current to a primary winding $2^a$ of the transformer 2, which winding is connected to a return circuit conductor G. The transformer 2 also comprises a secondary winding $2^b$ from which energy is supplied to the polyphase motor 4 through the agency of the phase converter 3.

The phase converter 3 comprises a plurality of stationary windings 10 and 11 which are associated with the stator or stationary magnetizable member (not shown) and which are disposed in quadrature relation, the one to the other, as is well-known in practice. The winding 10 constitutes an exciting winding which is adapted to be connected across the major portion of the transformer winding $2^b$, while the winding 11 is the secondary winding and is designed to deliver a quadrature voltage of substantially 86.6% of that of transformer winding $2^b$. One terminal of the converter secondary 11 is adapted to be connected to substantially the mid-point 13 of the transformer winding $2^b$. Thus, the converter secondary voltage, when combined with that of said transformer winding $2^b$, produces balanced three-phase voltages, which are delivered to primary windings P of the polyphase driving motor 4 through conductors 15, 16, and 17.

The phase converter 3 embodies a rotor 20, or rotatable magnetizable member, which is disposed in inductive relation to the windings 10 and 11 and is provided with a plurality of windings 21 and 22. Said winding 22 is coöperatively engaged by a plurality of sets of brushes 25 and 26. The winding 21 constitutes the main rotor winding for carrying the power currents induced therein under load conditions, and the terminals of said winding are connected to a pair of slip rings 27 and 28 that coöperatively engage brushes 29 and 30. A switch $h$ is connected to the respective brushes 29 and 30 and, when the converter has reached its synchronous speed, said switch is closed to complete a closed circuit through the winding 21, although said switch is opened during the starting operation to render said winding 21 inoperative.

In order to permit of short-circuiting the several sets of brushes 25 and 26, under certain operating conditions, said brushes are separately connected to a plurality of stationary switch members $29^a$ which are adapted to be short-circuited through a movable switch member $30^a$ when said switch member is closed into engagement therewith.

For the purpose of compensating for the phase distortion in the converter under load conditions, an adjustable number of turns $T_t$ of the transformer secondary winding $2^b$ are adapted to be connected in circuit with an adjustable resistor 32 and the set of brushes 26, while a variable number of turns $T_c$ of the converter secondary winding 11 is adapted to be connected in circuit with an adjustable resistor 33 and the set of brushes 25. In the manner just described, variable out-of-phase voltages are introduced into the respective circuits of the rotor magnetizing winding 22, and, since the normal phase positions of the voltages in said circuits are in substantially 90° relation with the added compensating voltages introduced, it is manifest that the phase of the converted electromotive force may be regulated or advanced as desired by properly choosing the amount of the added phase-advancing voltages.

Switching devices $a$, $b$, $c$, $d$, $e$, $f$, $g$, $h$, $i$, $j$ and $k$ are provided for accomplishing the rearrangement of circuit connections for either starting or operating conditions. These switching devices are illustrated, for the sake of simplicity, as ordinary hand-operated switches, but it is evident that any form of switches may be utilized, and, for commercial practice, it would undoubtedly be desirable to employ electrically operated switches of the unit type.

So far as the driving motor 4 is concerned, it is merely illustrative of any suitable and well-known class of apparatus for translating electrical energy into mechanical energy. As shown, the motor comprises primary windings P and secondary windings S that are connected in delta relation and are also inductively related in the manner of the usual form of polyphase induction motors. The resistor 5 may also take any form that is adapted for accomplishing the control of the motor 4, and is not restricted to a liquid rheostat, as illustrated.

Assuming the various circuit connections to be as shown in the figure, the operation of the system is as follows: inasmuch as the switching device $j$ for regulating a starting resistance 35 is closed, a circuit is established from a point 36 in the transformer winding $2^b$ which includes starting resistor 35, switch $j$, brushes 25 and commutated winding 22, and thence, through switch $k$, converter stator winding 10 and switch $c$, to the lower terminal of the transformer winding $2^b$ (Fig. 6). Under these conditions, single-phase alternating current energy of low voltage is supplied to the converter 3, the windings and circuit connections of which are such as to constitute, in effect, a series motor, whereby the converter is started into operation in accordance with well-known principles. The switch $j$ is then manipulated to gradually cut-out the various sections of the resistor 35 until the speed of the converter has been brought up to its normal substantially synchronous running speed, as will be understood. The switch $i$ is closed during this starting operation to improve the commutation at the brushes 25 by inductive compensation.

Figure 7:
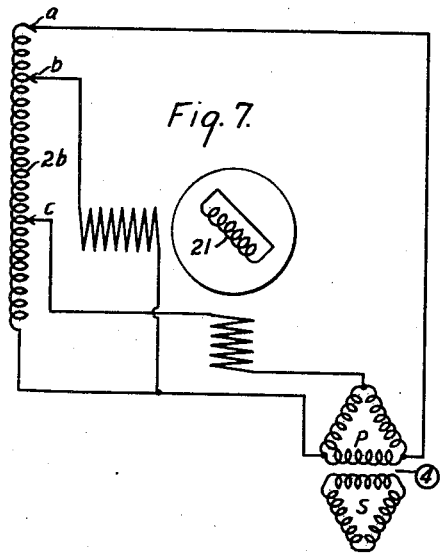

When the normal running speed is attained, switches $i$, $j$ and $k$ are opened, and switches $a$, $b$, $c$, $h$ and $x$ are closed. In this manner, the converter windings 10 and 11 are connected to the transformer winding $2^b$ and to the driving motor 4 to establish the electrical relations hereinbefore set forth and which are old and familiar in the art (Fig. 7). Obviously, the closure of the switch $h$ establishes a closed circuit for the winding 21 which, therefore, may serve to carry the induced rotor power currents. Having connected the phase converter in the manner referred to, energy is supplied thereto and it maintains its normal speed and delivers polyphase energy to the driving motor 4 under all operating conditions.

Figure 8:
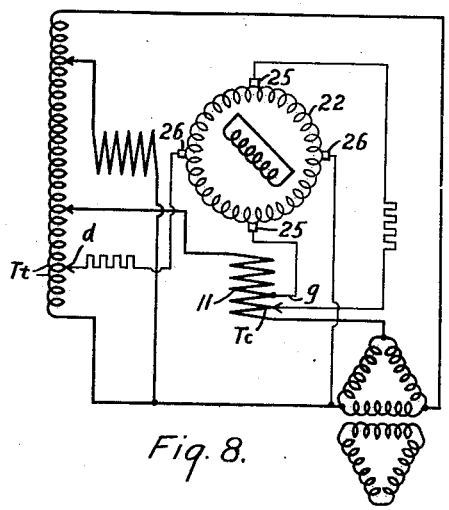

It is well known that, under load conditions, there is an inherent tendency in a phase converter to produce a distortion in the phase position of the converted energy, which results in an undesirable operating condition. For the purpose of correcting for this phase distortion under load conditions, switches $d$, $f$ and $g$ are closed to connect turns $T_t$ and $T_c$ of the transformer winding $2^b$ and converter winding 11 in circuit with the magnetizing winding 22 through the respective sets of brushes 26 and 25 as already pointed out (Fig. 8). By suitably adjusting the turns through the agency of the switches $d$ and $g$ or the resistors 32 and 33, the proper amount of out-of-phase phase-advancing voltages may be introduced into the respective circuits of the rotor magnetizing winding 22.

The phase converter 3, therefore, embodies within itself and has, as an inseparable part thereof, means by which it is started into operation and, moreover, is subsequently regulated to compensate for its inherent phase distortion under load conditions.

In some instances, it may be desirable to employ means in addition to the winding 21 for handling the induced power currents and, for this purpose, the switch $30^a$ may be closed to short-circuit the brushes 25 and 26. In fact, it would be possible, although probably not desirable, to dispense entirely with the power winding 21 and rely upon the short-circuited brushes for carrying the induced rotor currents. When said switch $30^a$ is closed, the switches $g$ and $d$ must be opened to avoid short circuiting the turns $T_c$ and $T_e$.

Reference may now be had to Fig. 3 which illustrates a phase converter and system of a similar character to that just described, with the exception that the rotatable member $20^a$ of the converter differs in its construction and circuit connections and embodies only a single winding 22. Said winding is connected to the commutator 23 in the manner already set forth and is designed and adapted to carry the induced power currents as well as the out-of-phase compensating magnetizing currents that are introduced as previously described. By thus combining the power and the magnetizing or wattless currents in a single winding, the copper losses are materially reduced, as is well known by those skilled in the art. For the purpose of securing the relative amounts of power and wattless energy that are required in the winding 22 under any operating conditions, it is desirable to provide an adjustable rocker ring 40 for carrying the several sets of brushes 25 and 26, whereby the brushes may be shifted to accomplish the desired results. The exact position of the brushes will, of course, depend, in each case, upon the electrical characteristics of the system and apparatus and the amount of magnetizing or wattless current that it is desirable to maintain.

In Figs. 4 and 5 is disclosed a phase converter 3 of a somewhat different type that is adapted to be started into operation from a direct-current source, such as a battery B, or any other suitable source of energy, through the agency of the winding 22 and its associated brushes 25—25. Slip rings 47 and 48 are connected to opposite points in the winding 22 and have engagement respectively with brushes 49 and 50. The rotating member $20^b$ may further be provided with a normally open-circuit winding 52 which serves as a damping winding for the purpose of stabilizing the operation of the machine, in the manner of the well-known damping windings employed upon synchronous motors. Said winding 52 is connected to slip rings 53 and 54 which are adapted to be short-circuited only during operating conditions.

Switching devices $m$, $n$, $o$, $p$, $q$, $r$, $s$, $t$, $u$ and $v$ are also provided for the purpose of arranging the circuit connections of the phase converter with respect to the transformer 2, the driving motor 4 and the auxiliary source of energy B. Any form of switching devices may, of course, be employed.

Figure 9:
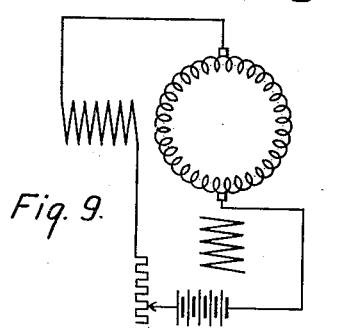
Figure 10:
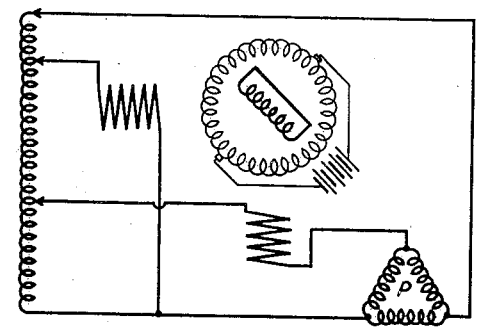

Assuming the circuit connections to be as illustrated in the figure, direct-current energy is supplied from one terminal of the battery B through switch $r$, starting resistor 35, brushes 25 and associated winding 22 and thence, through switch $s$, converter winding 10 and switch $q$, to the battery (Fig. 9). In this way, direct-current energy is supplied to the phase converter 3 which is connected as a series direct-current motor, and, by suitably manipulating switching device *r* and cutting out the starting resistor 35, the converter is brought up to its synchronous running speed.

Under these conditions, the switches *q*, *r* and *s* are opened and switches *m*, *n*, *o*, *p*, *t*, *u* and *v* are closed, thereby connecting the converter to the transformer 2 and to the driving motor 4, as is common practice and as is hereinbefore set forth. Moreover, the battery B is connected to the brushes 49 and 50 which engage the slip rings 47 and 48, through the switches *t* and *u*, whereby direct-current excitation is applied to the winding 22 of the converter rotor. The converter, therefore, is operated as a synchronous machine.

Various modifications in circuit connections, arrangement and location of parts and mode of operation, may be effected without departing from the spirit and scope of my invention, and such modifications are intended to be covered by the appended claims.

I claim as my invention:

1. In a phase converter, the combination with relatively rotatable members in inductive relation, of a plurality of windings associated with said rotatable member and a commutator cylinder and set of slip rings respectively connected to said windings, means whereby the winding connected to said commutator cylinder is utilized for bringing the converter up to speed and subsequently for effecting phase compensations therein under load conditions, and means whereby the other winding serves to carry the working currents under load conditions.

2. In a phase converter, the combination with a stationary member having a plurality of windings in quadrature relation, and a rotatable member having a plurality of windings, of a commutator cylinder associated with one of said windings, a plurality of sets of brushes coöperating therewith and disposed in quadrature relation, and means for opening and closing the circuit of the other windings.

3. In a phase converter, the combination with relatively rotatable members disposed in inductive relation, of a winding and associated commutator cylinder constituting a part of the rotatable member, a plurality of sets of brushes coöperating with said commutator cylinder, means coöperating with said brushes for effecting phase compensations in said converter under load conditions, and means for short-circuiting said brushes.

In testimony whereof I have hereunto subscribed my name this 12th day of Mar., 1915.

FRIEDRICH W. MEYER.

Witnesses:
D. C. DAVIS,
B. B. HINES.